United States Patent [19]

Emonts

[11] Patent Number: 4,517,801
[45] Date of Patent: May 21, 1985

[54] SUPERCHARGING PRESSURE CONTROL DEVICE FOR TURBOCHARGED INTERNAL COMBUSTION ENGINES

[75] Inventor: Johannes Emonts, Grossberghofen, Fed. Rep. of Germany

[73] Assignee: Bayerische Motoren Werke AG, Fed. Rep. of Germany

[21] Appl. No.: 463,680

[22] Filed: Feb. 4, 1983

[30] Foreign Application Priority Data

Feb. 4, 1982 [DE] Fed. Rep. of Germany ....... 3203805

[51] Int. Cl.³ ............................................ F02B 37/12
[52] U.S. Cl. .................................................... 60/602
[58] Field of Search ................... 60/600, 601, 602, 603

[56] References Cited

U.S. PATENT DOCUMENTS

| | | | |
|---|---|---|---|
| 4,248,047 | 2/1981 | Sumi | 60/602 |
| 4,271,672 | 6/1981 | Withalm et al. | 60/602 |
| 4,373,335 | 2/1983 | Kuribayashi | 60/602 |

Primary Examiner—Michael Koczo
Attorney, Agent, or Firm—Craig and Burns

[57] ABSTRACT

A supercharging pressure control device for mixture-compressing internal combustion engines comprises a bypass valve in a bypass conduit circumventing exhaust gas turbine. A regulating unit of the bypass valve is acted upon by supercharging pressure in an opening direction and by an actuator connected downstream of a throttle valve in the closing direction. The actuator contains a pressure limiting valve and, in parallel thereto, a check valve.

2 Claims, 2 Drawing Figures

SUPERCHARGING PRESSURE CONTROL DEVICE FOR TURBOCHARGED INTERNAL COMBUSTION ENGINES

TECHNICAL FIELD

This invention relates to a supercharging pressure control device.

BACKGROUND ART

A conventional supercharging pressure control device of this type of construction is disclosed in German Offenlegungsschrift No. 2,928,902. The control device in the control conduit is connected downstream of the throttle valve and to the second chamber of the regulating unit. The control device consists of a check valve which, depending on the desired operating mode, opens when a vacuum prevails downstream of the throttle valve or is blockable in the closed position. With this supercharging pressure control, the closing force acting on the bypass valve, when the check valve is not blocked, is reduced only if the pressure in the intake manifold lies below atmospheric pressure. A marked reduction of the closing force to avoid unnecessary buildup of supercharging pressure upstream of the throttle valve occurs only in the lower partial load range wherein no high supercharging pressures and exhaust pressures are reached even with customary supercharging pressure regulation. Therefore, the advantage attainable with this supercharging pressure control is relatively minor.

DISCLOSURE OF THE INVENTION

The invention is based on the object of providing a supercharging pressure control device which avoids the unnecessary buildup of supercharging pressure substantially within the entire partial load range. In other words, no excess supercharging pressure is to be built up, which must again be reduced by an incomplete opening of the throttle valve.

On account of the supercharging pressure control device of this invention, the unnecessary supercharging pressure upstream of the partially closed throttle valve and the exhaust pressure upstream of the exhaust gas turbine are reduced almost in the entire partial load range. The effectiveness of this supercharging pressure control rises with lessening pressure in the intake manifold. In case of internal combustion engines with high supercharging pressures, this supercharging pressure control is especially expendient. The supercharging pressure control device of this invention makes it possible to lower fuel consumption by the following effects:

(1) Losses due to charge reversing work are reduced.

(2) Operation with a leaner mixture and more favorable ignition angles becomes possible by a lower supercharging air temperature and a smaller amount of hot residual gas.

(3) Due to the smaller residual gas proportion, a faster and more complete combustion is achieved.

Another advantage resides in an improvement of the dependency of the load on the desired load signal (gas pedal position).

An especially economical construction of the supercharging pressure control device according to this invention is also advantageously provided. In this connection, it is to be noted also that the bypass valve is more cost-efficient than without the use of this invention, since a weaker closing spring is utilized.

These and other objects, features and advantages of the present invention will become more apparent from the following description when taken in connection with the accompanying drawings which show, for purposes of illustration only, one embodiment in accordance with the present invention.

BEST MODE FOR CARRYING OUT THE INVENTION

Figure 1:
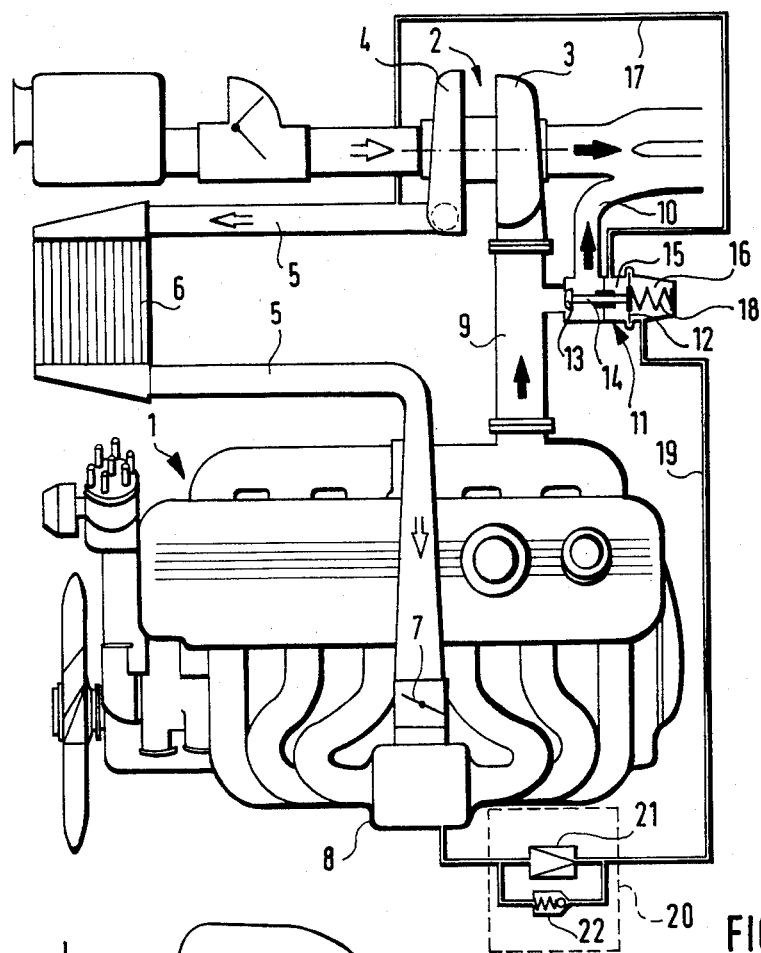
FIG. 1 is a schematic view of an internal combustion engine with an exhaust turbocharger.

An internal combustion engine 1 is equipped with an exhaust turbocharger 2. The exhaust turbocharger 2 includes an exhaust gas turbine 3 and a supercharger 4. From the supercharger 4, a supercharger air conduit 5 leads via a supercharger air cooler 6 to a throttle valve 7 connected upstream of an intake manifold 8 of the internal combustion engine 1.

The exhaust gas turbine 3 is connected to an exhaust manifold 9 of the internal combustion engine 1. A bypass valve 11 is arranged in a bypass conduit 10 extending in parallel to the exhaust gas turbine 3. This bypass valve regulates the exhaust gas stream bypassing the exhaust gas turbine 3 and thus, also controls the latter.

The bypass valve 11 comprises in its regulating unit a diaphragm 12 as the driving element, making it possible to move a valve member 13 of the bypass valve 11 by means of a connecting rod 14. The diaphragm 12 separates a first chamber 15 and a second chamber 16 from each other. The first chamber 15 is connected, via a first control conduit 17, to the supercharger air conduit 5 downstream of the supercharger 4 so that the diaphragm 12 is conventionally acted upon by the supercharging pressure in the intake direction. The second chamber 16 contains a closing spring 18 acting in the closing direction of the bypass valve 11 and is connected via a second control conduit 19 to the intake manifold 8 downstream of the throttle valve 7. An actuator 20 is inserted in the control conduit 19. The actuator 20 comprises a conventional pressure limiting valve 21 and, in parallel thereto, a conventional check valve 22 opening toward the intake manifold 8.

Figure 2:
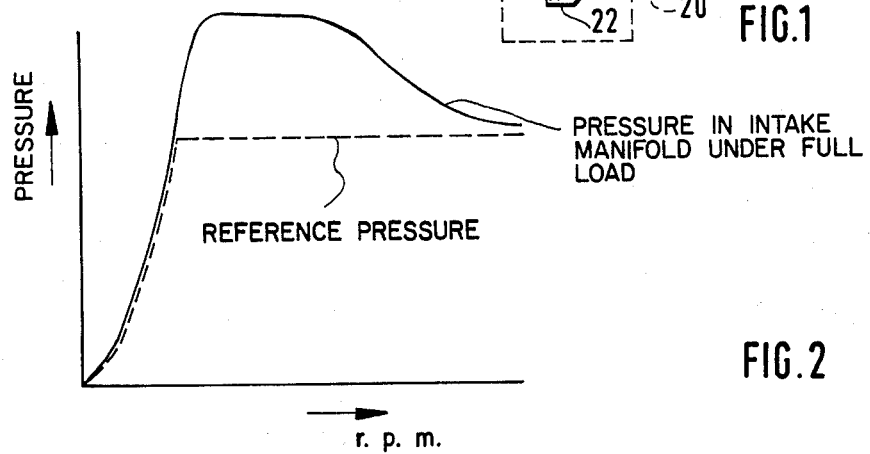
FIG. 2 shows a diagram of the supercharging pressure curve plotted over the number of revolutions at full load.

In customary supercharging pressure control means, the second chamber 16 is in communication with the atmosphere and contains a closing spring, the bias of which is adapted to the supercharging pressure desired under full load. In contrast thereto, the closing spring 18 in the present supercharging pressure control device exhibits a considerably reduced bias. The pressure limiting valve 21 limits the pressure in the second control conduit 19 to a reference pressure. The reference pressure is lower than the lowest pressure in the intake manifold 8 prevailing in the upper rpm range under full load (FIG. 2). The reference pressure exerts a force on the diaphragm 12 acting in the closing direction of the bypass valve 11. The bias of the closing spring 18 is reduced, as compared with the aforedescribed, customary design, by the amount of this pressure force, so that the previous full-load pressure curve in the intake manifold 8 remains preserved. When changing over to partial load by closing the throttle valve 7, the pressure in the intake manifold 8 drops. If the value falls below the reference pressure line (FIG. 2), the same pressure prevails in the intake manifold 8 and in the second chamber 16 of the bypass valve 11. For this purpose, the second chamber 16 is vented via the check valve 22. If the pressure in the intake manifold 8 lies below the reference pressure line, the closing force of the bypass valve is reduced and, in some cases, entirely eliminated except for the proportion of the closing force of the closing spring 18, or even becomes negative by a corresponding vacuum in the intake manifold 8.

In contrast to the above-mentioned, customary supercharging pressure control, the bypass valve 11 in the present supercharging pressure control device is kept open over a substantially larger operating range. Thereby, the unnecessary supercharging pressure upstream of the partially closed throttle valve and the exhaust gas counterpressure upstream of the exhaust gas turbine are reduced almost in the entire partial load range.

While I have shown and described one embodiment in accordance with the present invention, it is understood that the same is not limited thereto but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A supercharging pressure control device for a mixture-compressing internal combustion engine having an exhaust gas turbocharger operable in response to actuation of a throttle valve, comprising:
    a bypass valve and a bypass conduit for the exhaust gas turbocharger, the bypass valve being disposed in the bypass conduit,
    a regulating unit for the bypass valve operably responsive in opening and closing directions to intake pressure in an intake arrangement for the engine and supercharging pressure from the exhaust gas turbocharger, respectively,
    a diaphragm separating the regulating unit into two chambers and being operable as a drive element in the regulating unit,
    a first chamber of said regulating unit being directly responsive to supercharged air passing through a first control conduit connected to said exhaust gas turbocharger upstream of said throttle valve and
    a second chamber of said regulating unit including a closing spring and being connected to the intake arrangement downstream of the throttle valve by an actuator and a second control conduit,
    the actuator including a pressure limiting valve limiting pressure in the second chamber to a predetermined reference pressure.

2. The supercharging pressure control device according to claim 1, wherein
    the pressure limiting valve is arranged in parallel to a check valve operable toward the intake arrangement.

* * * * *